United States Patent [19]
Whiteley

[11] Patent Number: 4,605,874
[45] Date of Patent: Aug. 12, 1986

[54] BRUSHLESS D.C. DYNAMOELECTRIC MACHINE HAVING FERRITE MATERIAL MAGNETIC CIRCUIT

[75] Inventor: Eric Whiteley, Peterborough, Canada

[73] Assignee: Maghemite Inc., Mississauga, Canada

[21] Appl. No.: 703,388

[22] Filed: Feb. 20, 1985

[30] Foreign Application Priority Data

Jun. 12, 1984 [GB] United Kingdom ............... 8414953

[51] Int. Cl.⁴ .............................................. H02K 1/16
[52] U.S. Cl. .................................... 310/268; 310/156
[58] Field of Search ............ 310/40 MM, 43, 44, 154, 310/156, 181, 268

[56] References Cited

U.S. PATENT DOCUMENTS

| | | | |
|---|---|---|---|
| 2,873,395 | 2/1959 | Kober | 310/268 |
| 2,885,645 | 5/1959 | Wennerberg | 310/44 |
| 3,466,483 | 9/1969 | Johnson et al. | 310/268 |
| 4,020,372 | 4/1977 | Whiteley | 310/268 |

Primary Examiner—Patrick R. Salce
Assistant Examiner—D. L. Rebsch
Attorney, Agent, or Firm—Sim & McBurney

[57] ABSTRACT

A dynamoelectric machine which may operate in a motor mode or a generator mode is described wherein substantially the entire magnetic circuit is provided by ferrite material. In one particular embodiment, hard ferrite permanent magnet segments are mounted on a rotor plate while soft ferrite magnet segments with electrical coil windings mounted thereon are provided in a stator spaced apart from the rotor by an air gap. Other embodiments of the concept are described.

6 Claims, 9 Drawing Figures

BRUSHLESS D.C. DYNAMOELECTRIC MACHINE HAVING FERRITE MATERIAL MAGNETIC CIRCUIT

FIELD OF INVENTION

The present invention relates to a dynamoelectric machine of improved design.

BACKGROUND TO THE INVENTION

Dynamoelectric machines, including brushless D.C. motors and conventional D.C. permanent magnet motors, have been known for many years. A typical dynamoelectric machine has phased windings in a stator and permanent magnets on a rotor. The two components are separated by an air gap so that rotation of the rotor may occur.

Brushless and conventional permanent magnet D.C. motors are described, for example, in the engineering handbook entitled "D.C. Motors, Speed Controls, Servo Systems" (5th Ed., 1980) published by Electro-Craft Corporation, Hopkins, Minn., U.S.A. and reference may be made thereto to ascertain the current state of the art.

Some features of the prior art are employed in specific applications of the concepts of the invention. From the prior art, it is known to provide disc motors with axial air gaps, disc motors with permanent magnet poles on the rotor and phased windings on the stator, disc motors with ferrite permanent magnet poles on the rotor, disc motors with more than one rotor disc on a common shaft and with more than one wound stator interposed among the rotor discs to obtain multiple torque-producing combinations, motors with an even number of poles on the rotor, motors with the same number of poles on rotor and stator, motors with different numbers of poles on rotor and stator, motors with windings in slots in the stator, motors with windings distributed on the air-gap surface of the stator and no stator slots, and motors of concentric cylindrical shape as an alternative to the disc-like form.

SUMMARY OF INVENTION

In the present invention, there is provided a motor or generator, i.e. a dynamoelectric machine, in which substantially the entire magnetic circuit is formed of ferrite material or a material with ferrite-like properties.

The use of ferrite materials to provide the magnetic circuit of a dynamoelectric machine in accordance with this invention leads to a number of advantages, in comparison to conventional dynamoelectric machines, as will become more apparent from the detailed discussion of the invention below.

Among the advantages are the ability to provide a lower cost dynamoelectric machine for a given torque and power, the ease and economy of mechanized manufacturing, lower core losses than conventional dynamoelectric machines, and the capability of operating at higher pulse frequencies than conventional dynamoelectric machines.

GENERAL DESCRIPTION OF INVENTION

Figures 1, 2:
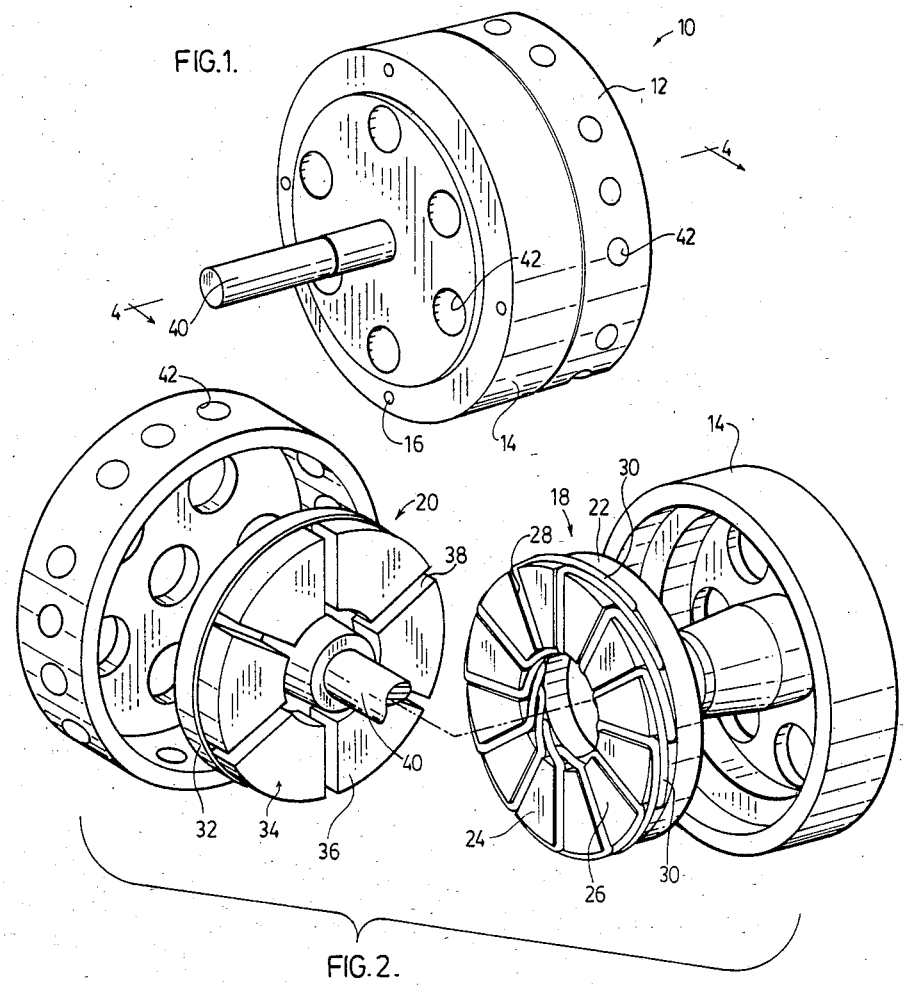
FIG. 1 is a perspective view of a brushless dynamoelectric machine constructed in accordance with one embodiment of the invention.
FIG. 2 is an exploded perspective view of the dynamoelectric machine of FIG. 1, illustrating the component parts.
Figure 3:
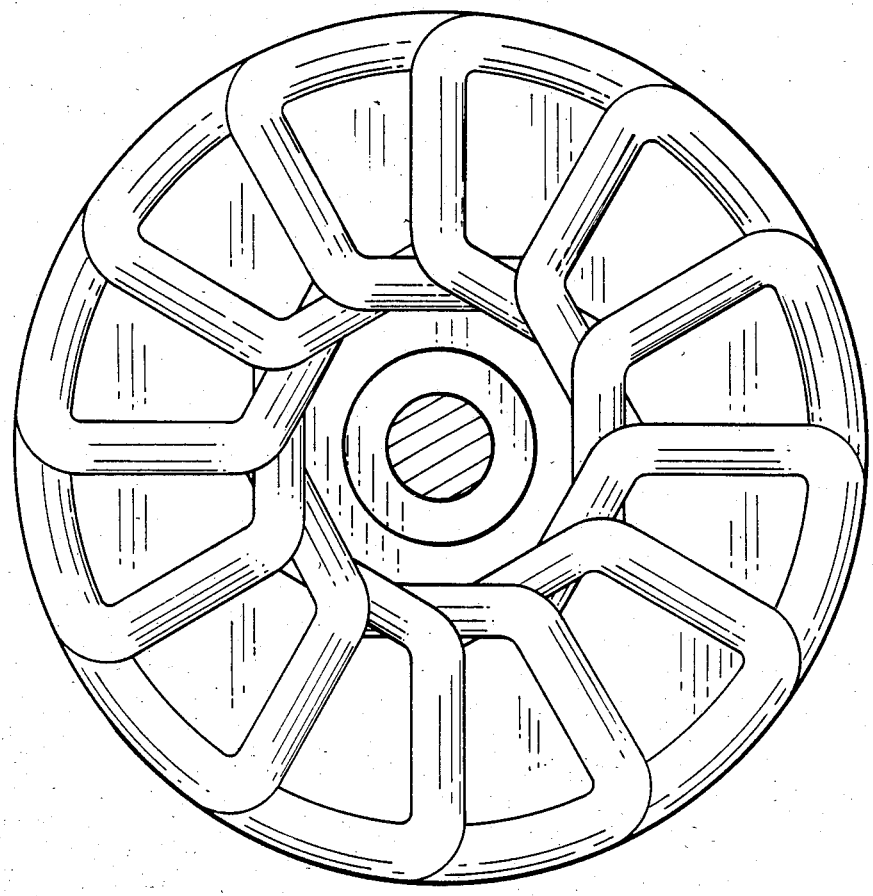
FIG. 3 is an elevational view of the stator of the dynamoelectric machine of FIG. 1.

In this invention, it is preferred that the magnetic circuit comprises a hard-ferrite permanent-magnet portion to provide coercive force and to produce magnetic flux in the magnetic circuit and a soft-ferrite portion. It is possible, however, to provide the magnetic circuit wholly of soft-ferrite material, with the magnetic flux being provided from suitably-energized coils associated with one portion of the soft ferrite material. It is also possible to employ materials which are magnetically equivalent to ferrites and these materials are referred to herein as "ferrite-like".

The combination of hard and soft ferrite materials or their magnetic equivalents enables the provision of an economical and effective dynamoelectric machine where the magnetic flux in the soft ferrites alternates in polarity at frequencies of the order of 100 Herz.

In the preferred embodiment of the invention, the hard-ferrite portion is arranged in a first substantially toroidal shape and the soft-ferrite portion is arranged in a second substantially toroidal shape. The toroidal shapes may be of unitary construction or may be segmented. Where the toroidal shapes are of unitary construction, the magnetic circuit consists entirely of ferrite material, while in the case of segmented toroids, the magnetic circuit consists substantially completely of ferrite material with a minor amount of magnetically-conducting material bridging the gaps in the ferrite structure. The magnetically-conducting bridges, constructed, for example, of iron or steel, may also form part of the mechanical structure of the motor and thereby fulfill two functions.

The choice of toroids of unitary or segmented construction depends, to a large extent, on the size of the motor. In smaller sizes, it is practical to make toroids as unitary structures. In larger sizes, the toroids are more practical as assemblies of segmented elements. With these two options, the dynamoelectric machine may vary in size from very small sizes, such as 1 cm. in diameter, to large sizes, such as several meters in diameter, with a corresponding wide range of motor torque and power.

The soft-ferrite toroid may be provided in the form of an axially-thin disc-like stator, while the hard-ferrite toroid may be provided in the form of an axially-thin disc-like rotor axially-aligned and spaced from the stator for rotation on its axis. Generally, the rotor is fixedly mounted on a shaft which is mounted to the stator for rotation relative thereto. Hard ferrite permanent magnets produce a magnetic flux in the magnetic circuit which is completed by soft ferrite material. Electrical windings are provided in or on the soft ferrite material to permit electrical energy to flow to or to flow from the structure, depending on whether it is operating as a motor or as a generator.

In this structure, it is for convenience of structure and operation, that the hard ferrite magnets are mounted on one face of the rotor while the soft ferrite material is mounted on one face of the stator facing the hard ferrite permanent magnets, although the ferrites may be mounted vice versa, if desired.

The air gap between the rotor and the stator permits relative motion between the permanent magnetic poles of the hard ferrite permanent magnets and the soft ferrite portion and associated electrical windings. Interaction of the moving magnetic flux and the electrical windings produces motor torque when the windings are suitably connected and electrically energized. Alternatively, if a driving force is applied to the rotor, then the windings produce an output of electrical energy and the device acts as an electrical generator.

The preferred device of the invention may be termed a ferrite toroid motor, since the magnetic parts are generally provided in the form of toroids of hard and soft ferrite material.

In one preferred embodiment of the invention, a two-phase operation is employed wherein transient energy is transferred from one coil phase to the other.

The term "ferrite" is widely used and understood in the field of magnetic materials, to designate a particularly class of magnetic materials, generally chemically depicted as $MO.Fe_2O_3$ where MO represents a metal oxide of a metal M, which typically is barium, strontium or lead.

The terms "hard" and "soft", as used herein to describe the ferrite material, are directed to the magnetic properties of the ferrite material rather than to the mechanical properties. The "hard ferrite" material is so compounded that, when heavily magnetized, a residual magnetism is retained and thereby the material becomes a permanent magnet. The "soft ferrite" material is compounded and processed to possess a high magnetic permeability and a very low residual magnetism after exposure to magnetic flux. Mechanically, both ferrites are ceramic in nature, i.e. they are hard, difficult to machine and somewhat brittle.

In the present invention, it is the magnetic properties of the ferrites which are of significance and any material with similar magnetic properties is usable in place of the ferrite. The normal induction curve or hysteris loop, i.e. the plot of magnetization resulting from a magnetizing and demagnetizing field, in the second quadrant is a straight line for the preferred grades of permanent magnet ferrites used herein, and any other material having the same or similar differential permeability may be used, for example, the family of cobalt rare earth magnets. It is preferred to use permanent magnet hard ferrites having a differential permeability of about 1.

The hard ferrite toroid used in this invention preferably is provided in a multipolar pattern in the axial direction by providing a plurality of toroid segments, for example, four, corresponding in number to the number of magnetic poles, mounted in a uniform pattern on a suitable support plate. The combination of such a hard magnet toroid with a soft ferrite toroid to form the entire magnetic circuit in a motor or generator is novel in the art.

The ferrite components of the device of the invention preferably are formed from powdered ferrite material by compression in a mould or die to the shape of the cavity. The molded part then may be fired in a suitable furnace to produce the final ceramic-like properties. This operation may be supplemented by heat treatment, if desired. This component-forming procedure is economical and simple to effect. In contrast, conventional motor possess core structures made by assembling laminations of special grade steel, generally involving a number of operations and machines or significant labor time.

The use of molding operations to form the toroids enables a variety of shapes, including intricate shapes, to be produced at a relatively low cost. Slots in the face of the soft ferrite toroid for windings and other recesses or contours may be provided during the moulding operation, so that a soft ferrite toroid may be produced in its final form in a single step.

Alternatively, the soft ferrite toroid may be assembled from a plurality of individually-molded segments. Joints between adjacent segments are suitably shaped and located in the pole and slot contours of a soft ferrite toroid so as to minimize their effect on the magnetic performance.

The hard ferrite rotor is usually made by forming hard ferrite poles and assembling the poles to a steel support plate, which functions not only as a mechanical support but also as a magnetic bridge for the flux that must pass from pole to pole. Alternatively, hard ferrite joints may be used on pole center lines. These segments are magnetized with a half-pole at each radial edge. Such segments may be carried by a non-magnetic support disc, such as aluminum or plastic, which may be molded or die-cast to shape, or may be produced as an assembly operation.

The motor structure of the invention has a phased electrical winding in slots located in the gap side face of the soft ferrite toroid. The number of slots receiving windings usually corresponds to the product of the number of poles of the hard ferrite toroid and the number of phases of the power to be applied to or generated from the windings. For example, for two-phase windings, two slots and hence windings may be provided for each magnetic pole of the rotor. The electrical winding may be provided by pre-winding wire into several coils of the same shape, which coils are then assembled into the slots in the soft ferrite toroid to form the final winding arrangement. Alternatively, wire can be wound directly into the soft ferrite toroid slots to produce the final winding arrangement in a single operation.

The wire coils may be fixed in place in the soft ferrite toroid slots by any suitable adhesive, for example, an epoxy polymer resin, or the slots may be suitably shaped to retain the wires in them by mechanical action. The winding slots used herein are much simpler to insulate for receiving the windings than in conventional motors. This result arises from the high surface area and bulk electrical resistance of the soft ferrite material used in the stator, in contrast to the highly conductive laminated steel used in conventional motors. In the motors of the invention, a toroid can be effectively insulated by a thin coating of insulating material applied, for example, as a liquid or a powder which is fused into a solid film by heat.

The planar axial air gap between the rotor and the stator provided in the motor construction of the invention may be adjusted by mechanically altering the axial location of the rotor relative to the stator. The adjustment may be to a final predetermined setting, enabling manufacturing tolerance variations to be accounted for in final assembly of the structure. Alternatively, the assembly may be provided with means for user adjusting the gap to enable a desired operating speed to be provided. A shorter air gap lowers operating speed for a given applied voltage while a longer air gap increases operating speed for the given applied voltage when operating in the motor mode. Similar considerations apply when the device is operating in the generator mode.

As a core material for the electrical windings, the soft ferrite has an extremely low core loss at input power pulse frequencies well above those used in conventional motors. This property permits the toroid motors of the invention to be designed with more poles than conventional motors while still having much lower core losses. Using more poles results in a smaller yoke cross-sectional area and the motor thereby is smaller and lighter than otherwise is the case for a given motor size. The toroid motor of the invention, therefore, can be produced at a lower cost than prior art motors.

The use of additional poles also makes the mean length of each turn in the windings shorter and hence decreases winding resistance. The smaller core losses and decreased winding resistance provide a higher efficiency than for motors of conventional construction.

The increased number of poles and less flux per pole produces a toroid motor having a lower inductance in its windings, so that less inductive energy needs to be handled when commutating the motor windings, which permits less expensive controls to be used. As a result, the motor of the invention has a fast response and high performance characteristics.

When a conventional D.C. motor or brushless motor has a load current in its windings, the winding produces ampere-turns which oppose the MMF of the permanent magnets, tending to demagnetize the magnets, so that conventional motors are often load limited. With the ferrite permanent magnets used in this invention, the load limit is much higher, and with the added soft ferrite toroid, the toroid motors have an incrementally higher winding reaction limit, so that the toroid motor can work at very high load currents without the danger of demagnetizing the permanent magnets.

One of the advantages of the utilization of ferrite material in the construction of the dynamoelectric machine of the invention, especially in the disc form of toroid motor, lies in ease and economy of manufacture, which is particularly susceptible to automated assembly.

In operation, the toroid motors of the invention generate heat as a result of winding losses, some of which flows by conduction into the soft ferrite toroid. Cooling of the winding toroid component to dissipate this heat may be effected in a variety of ways, for example, evaporative cooling, liquid cooling, air flow cooling or heat sink cooling.

Evaporative cooling of the motor may be effected using any convenient cooling liquid, such as water, which has a considerable heat of evaporation, and hence effects cooling upon boiling. An enclosure may be provided in which the winding toroid is wholly or partly immersed in the cooling liquid. Alternatively, openings, ducts or channels may be provided in the toroid structure through which liquid can circulate. A further alternative is to use hollow conductors for the windings and circulate the cooling liquid through the conductors. The heat is absorbed by the liquid passing around or through the winding toroid, causing the liquid to evaporate by boiling and thereby to cool the winding toroid, as the motor operates. The heat carrying vapour may be removed to a cooling means, condensed to release its heat of vaporization and returned to repeat the cycle. An alternative to the latter closed system is to supply the liquid from a reservoir thereof and allow the heat-carrying vapor to escape into the surrounding atmosphere.

The structures described above to effect evaporative cooling also may be employed for liquid cooling, wherein the thermal capacity of the liquid itself is used to absorb heat as it rises in temperature, rather than the heat of evaporation of the liquid in the case of evaporative cooling.

Air cooling may be achieved using an external fan or may be induced by a fan mounted on the rotor shaft. The air flow should generally directly contact winding and toroid surfaces for the best effect. The motor may be wholly enclosed with internal air circulation carrying heat from the windings and toroid to the motor enclosure which, in turn, may be cooled by external air circulation or other convenient means.

Heat sink cooling involves using a body of material with a thermal mass such that it absorbs a certain amount of heat energy with a limited temperature rise. For continuous operation, the heat sink may be cooled by any suitable means, for example, self-convection air cooling, forced air cooling and liquid cooling, while for intermittent operation, the heat sink may simply absorb heat during a run phase and then cool down during an off phase.

A heat sink may be provided by extending a mounting flange on the stator toroid support plate which also may be the motor housing. Alternatively, a mass of heat absorbing material may be added to the motor with suitable properties and proportions. Such addition may be made at the mounting flange or at some other suitable location on the housing. Additional thermal mass may be added to the housing itself.

While it is a specific embodiment of the invention to provide the dynamoelectric machine in the form of a brushless D.C. dynamoelectric machine employing toroid rotor and stator, the principle thereof, namely the utilization of a magnetic circuit composed of ferrite or ferrite-like material, is applicable to a wide variety of types and designs of dynamoelectric machines, including conventional brush and commutator dynamoelectric machines.

In one alternative structure, two toroid stators may be provided, arranged one on each side of a toroid rotor which has a permanent magnet pole faces on both sides of the pole support structure. Two air gaps then are provided in which the magnetic pull forces are axially opposed and may effectively cancel one another out, leaving a net axial pull on the rotor which is zero or very small.

By employing two stators and a common rotor, the resulting dynamoelectric machine is smaller in diameter for the same torque or power, and then can operate to a higher speed and can have a lower rotor mechanical inertia. The availability of two sets of phased windings provides flexibility for phase arrangements and coil connection combinations which can be less complex to manufacture than if the same degree of complexity needed to be realized in a single stator.

Another alternative structure is a concentric cylindrical rotor and stator arrangement of hard and soft ferrite toroids, with a cylindrical air gap across which the magnetic flux flows radially.

DESCRIPTION OF PREFERRED EMBODIMENTS

Figure 4:
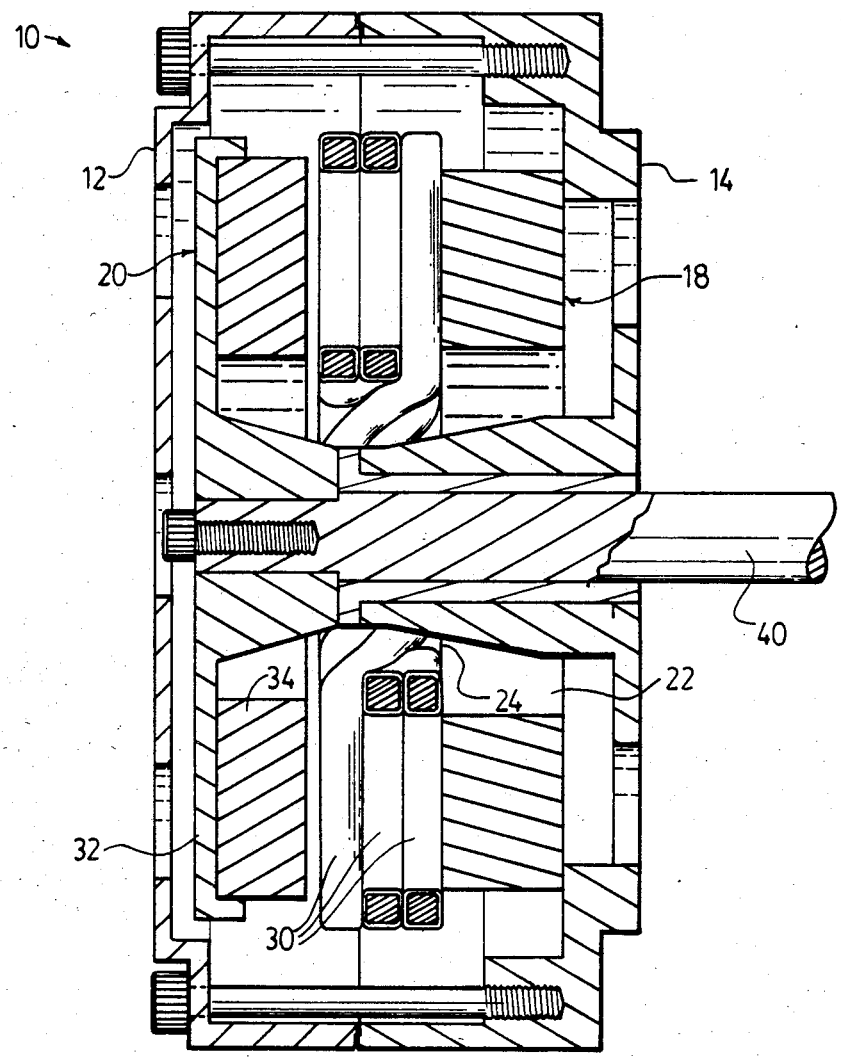
FIG. 4 is a sectional view of the dynamoelectric machine taken on line 4—4 of FIG. 1.

Referring to FIGS. 1 to 4, a brushless dynamoelectric machine 10 in accordance with one embodiment of the invention comprises a pair of housing members 12 and 14 which are bolted together by bolts 16 or otherwise joined to provide a hollow housing enclosing a stator 18 and a rotor 20, as seen particularly in FIGS. 2 and 4.

Both the stator 18 and the rotor 20 take the form of relatively thin discs which are mounted coaxially and spaced apart a short distance, as may be seen particularly in FIG. 4. The stator 18, which is fixedly mounted to the housing member 14, comprises two superimposed soft ferrite toroids 22 and 24 joined in face abutting relationship. The soft ferrite toroid 24 is formed into a plurality of segments 26 by slots 28 formed through the thickness of the toroid 24. Two superimposed soft ferrite toroids are used in the illustrated embodiment for ease of construction. If desired, however, a single soft ferrite toroid may be employed with the slots 28 formed to an appropriate depth in the surface thereof.

A plurality of electrical winding coils 30 is mounted in slots 28 in the soft ferrite segments 26. As may be seen in FIGS. 2 and 3, each of the coils 30 is mounted in a first of the slots 28 and in the next-but-one slot 28, and the area located within the periphery of each coil is one pole, thereby establishing a two-phase operation. The coils 30 of each phase are connected in series, or may be connected in parallel circuits each with coils in series.

The rotor 20 comprises a support plate 32, which may be constructed of steel or other ferromagnetic material, on which is mounted a toroid 34 of hard ferrite permanently magnetic material divided into segments 36 by the provision of slots 38, each segment providing a magnetic pole. The rotor 20 has a shaft 40 on which the rotor 20 is fixedly mounted and which extends through a bearing in the housing member 14 for rotation relative to the stator 18, spaced apart from the stator 18 a short distance. The shaft 40 provides the mechanical power output, if the dynamoelectric machine 10 operates as a motor, or the mechanical power input, if the dynamoelectric machine 10 acts as a generator.

For ease of construction and operation, it is preferred to employ hard ferrite permanent magnet segments 36 in the magnetic circuit. It is possible, however, to employ soft ferrite segments with appropriately-energized coils to produce the magnet poles on the rotor.

In the illustrated arrangement, six hard ferrite magnet segments 36 are provided for twelve soft ferrite segments 26 with the coils 30 being mounted for two-phase operation. Other combinations, however, are possible, for example, four hard ferrite segments 36 in combination with eight soft ferrite segments 26. For two-phase operation, the number of soft ferrite segments 26 and the number of coils 30 is twice the number of hard ferrite permanent magnet segments 36. For three-phase operation, the number of soft ferrite segments 26 and the number of coils 30 is three times the number of hard ferrite permanent magnet segments 36, i.e. eighteen in the illustrated embodiment of six hard ferrite segments.

In the motor mode of the operation of the dynamoelectric machine 10, as two-phase D.C. current is passed through the coils 30 to produce a magnetic field, interaction of that magnetic field with the magnetic field produced by the hard ferrite magnets 36 causes rotation of the rotor 20 and consequently the shaft 40, thereby to provide a mechanical power output. Similarly, when the dynamoelectric machine 10 operates in the generator mode, torque is applied to the shaft 40, so that the rotation of the hard ferrite magnetic field induces the provision of an alternating current output from the coils 30.

The housing members 12 and 14 are provided with openings 42 which act as air holes to cool the interior of the dynamoelectric machine 10.

Figure 5A:
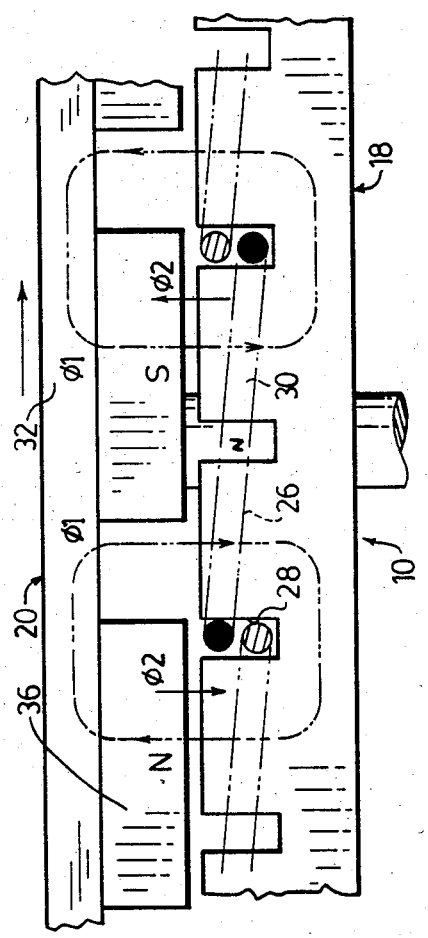
FIGS. 5A to 5C are close up views of the rotor and stator of the dynamoelectric machine at various stages of a torque producing cycle.
Figure 5C:
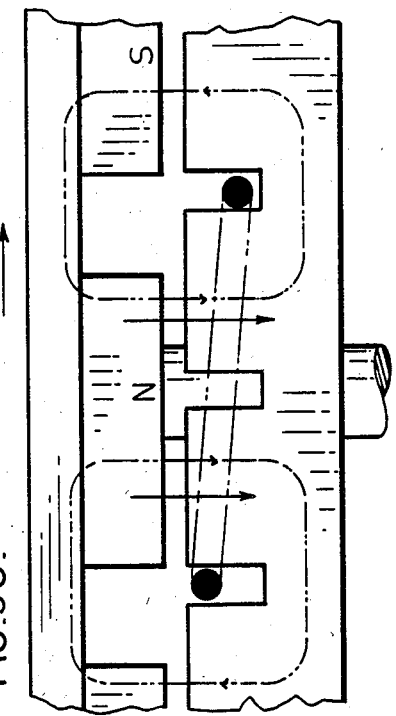
Figure 5B:
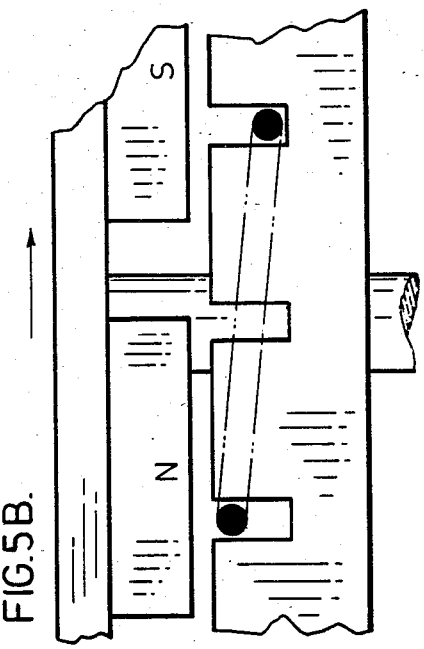

The generation of torque output in the shaft 40 by the dynamoelectric machine 10 when operating in the motor mode may be understood more clearly from the following description in relation to FIGS. 5A to 5C. Torque is developed by the inherent tendency of a magnetic circuit to adopt a configuration giving the maximum flux linking stator poles and rotor poles. In the motor 10, this force pulls the rotor poles into line with the stator poles to a position giving maximum flux linking the phase winding coils which are electrically excited at the time.

There is an interaction of two magnetic fluxes, one produced by the permanent magnet rotor poles 36 and the other produced by ampere turns in excited stator coils 30. In FIGS. 5A to 5C, these fluxes are identified as $\emptyset 1$ for the stator coils 30 and $\emptyset 2$ for the rotor magnets 36.

In the toroid motor 10, when one phase winding is excited, torque is produced at every pole by the same mechanism so that the total motor torque is the sum of the torques at each pole. In FIGS. 5A to 5C, the flux consequences of one rotor pole 36 moving past a stator coil 30 are considered, the procedure being repeated for each coil 30 of the same phase.

The rotor position shown in FIG. 5A is the start location for a torque producing cycle. The stator pole is provided by the coil 30 represented by the solid circle coil in the stator slots 29. At the location of the permanent magnet north pole of permanent magnet 36 in FIG. 5A, the north pole coil 30 is linked by a minimum flux with a maximum amount of permanent magnet flux opposing the flux produced by the coil 30.

As the rotor 20 moves towards the right, as seen in FIG. 5A under the influence of the opposing forces of the magnetic fluxes described above, the flux linking the coil 30 changes from south to north in polarity. A uniform rate of change of this flux can be assumed since the gap-flux from the permanent magnets 36 is essentially uniformly distributed over the roter pole faces and the movement of the rotor 20 is essentially at a uniform velocity.

FIG. 5B shows a mid-position for the permanent magnet north pole as it moves across the pole enclosed by the coil 30 and FIG. 5C shows the pole position when the flux linking the excited pole has reached its maximum value, which persists until the north pole reaches the position occupied by the south pole in FIG. 5A. No torque is produced while the flux linking the coil is unchanging, either at maximum or minimum levels.

The current in the coil 30 now is reversed and the cycle is repeated, otherwise the period of decreasing flux linkage is accompanied by production of negative torque. The several phases of the stator coils 30 are excited in sequence as the rotor 20 moves as a result of the flux interactions described above to produce a series of torque pulses that approximate a continuous torque.

Figure 6:
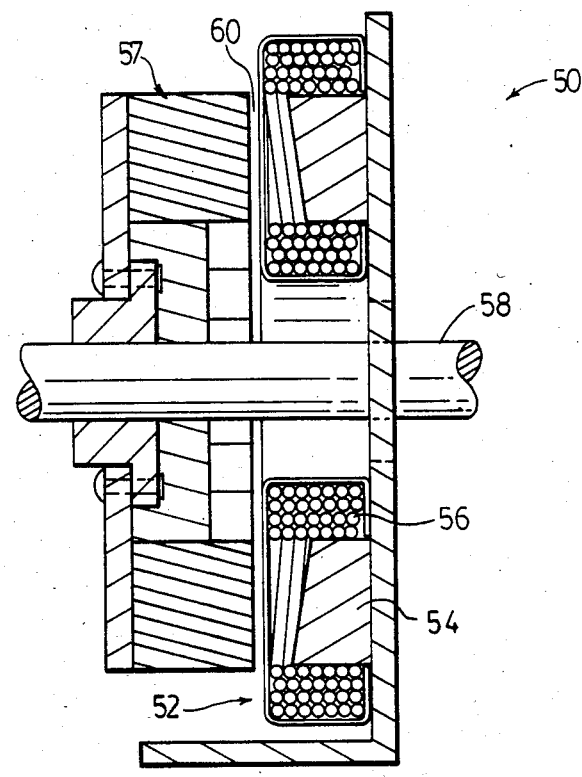
FIG. 6 is a side elevational and part sectional view of a brushless dynamoelectric machine constructed in accordance with a second embodiment of the invention.
Figure 7:
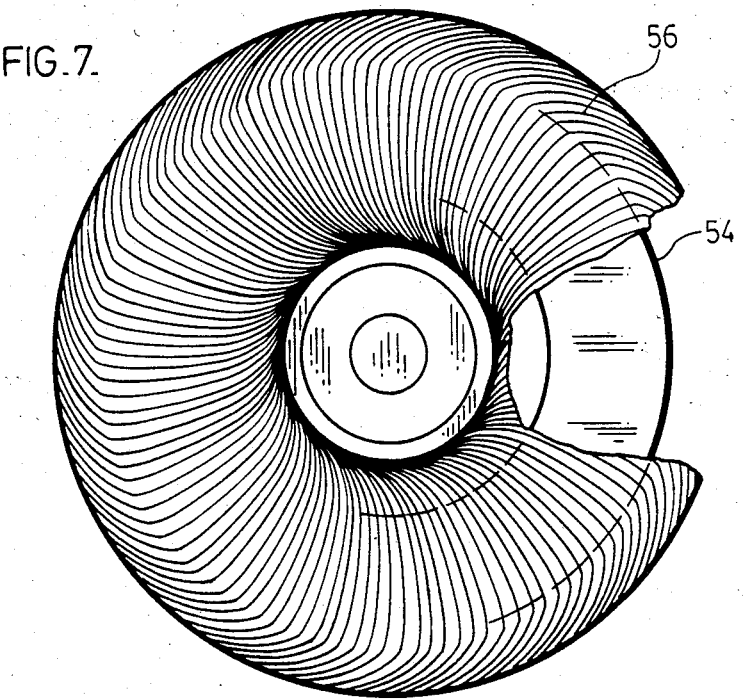
FIG. 7 is a front elevational view of the stator of the dynamoelectrical machine of FIG. 6.

In FIGS. 6 and 7, an arrangement of elements of a dynamoelectric machine 50 is provided similar to the construction of dynamoelectric machine 10 illustrated in FIGS. 1 to 4. In this embodiment, however, the stator 52 comprises a continuous toroid 54 of soft ferrite which is radially sloping to provide a narrower thickness at the inner periphery than at the outer. Coil windings 56 are arranged on the surface of the soft ferrite toroid 54 with the same conductor area at the toroid inner diameter as at the outer diameter. By radially sloping the stator toroid 54, the average air gap over the total toroid face area is shorter than otherwise and results in less permanent magnet for a given gap flux density. Tapering of the toroid face is readily achieved when molding the toroid. The coil winding may be connected in any desired phase relationship.

The rotor 57 may be constructed similarly to rotor 20 and is fixedly mounted on output/input shaft 58 so as to be mounted in rotatable relationship with the stator 52, spaced apart from the stator 52 by an air gap 60. Operation of the dynamoelectric machine 50 is similar to that described above for the dynamoelectric machine 10, except that the embodiment of FIGS. 6 and 7 can produce a smoother, more uniform torque, since the magnetic flux pulsations produced by the stator slots are absent.

The most significant difference between the embodiment of FIGS. 1 to 5 and that of FIGS. 6 and 7 is in the self-inductance of the windings. In FIGS. 1 to 5, about 50 to 60% of the self-inductance of the windings arises from the coil sides being in slots and thus being surrounded by material of high magnetic permeability. About 30% of the inductance is associated with the rotor magnets being mounted on a steel disc. This inductance can be decreased using a toroid of unitary construction, or abutting segments, mounted on a nonmagnetic rotor toroid support disc. The remaining about 10% inductance results from the end-heads of the windings and is present in both embodiments. In the embodiment of FIGS. 6 and 7, the inductance winding is considerably less, and may be decreased to about 20% of the motor of FIGS. 1 to 5. Low inductance in motor windings has advantages for the controls.

However, the embodiment of FIGS. 6 and 7 usually is more difficult to manufacture and involves the presence of eddy currents in the winding conductors, not present in the windings of the FIGS. 1 to 5 embodiment. The eddy currents may be decreased, but not eliminated entirely, however, by stranding the conductors.

In the embodiments of the invention described above with respect to FIGS. 1 to 7, a brushless dynamoelectric motor 10 or 50 is illustrated wherein the magnetic circuit is substantially completely provided by ferrite material in the form of a hard ferrite toroid of permanent magnet segments and a soft ferrite segmented toroid. As mentioned previously, however, the principles of construction and operation of the illustrated embodiments may be employed in a variety of structures and configurations. For example, the ferrite magnetic circuit may be employed with a commutator motor.

SUMMARY OF DISCLOSURE

In summary of this disclosure, the present invention provides a dynamoelectric machine of novel construction wherein ferrite material comprises the magnetic circuit and which has many disadvantages when compared with prior art structures. Modifications are possible within the scope of this invention.

What I claim is:

1. A brushless D.C. dynamoelectric machine, which comprises:
    a disc-like rotor element comprising hard ferrite toroid means providing a plurality of magnetic poles of alternating polarity and mounted for rotation about its axis,
    a disc-like stator element comprising soft ferrite toroid means and mounted coaxially with and spaced apart from the rotor element, said soft ferrite toroid means being formed with radially-directed coil winding-receiving slots, and
    electrical coil windings mounted to said stator in said slots and each spanning one rotor pole pitch.

2. The dynamoelectric machine of claim 1 wherein said soft ferrite toroid means is formed as a unitary structure having slots therein receiving said electrical coil windings.

3. The dynamoelectric machine of claim 2 wherein said hard ferrite toroid comprises an even-number of toroidal segments arranged in a multipolar magnetic circuit with each said toroidal segment constituting one pole to provide an axially-thin rotor, said soft ferrite toroid comprises an even-number of toroidal segments each spaced apart by one of said slots and mounted on a support disc to provide an axially-thin stator spaced apart from said rotor by said air gap to permit said rotor to turn relative to said stator about a common axis, and an even number of said electrical coils are mounted in said slots, each to enclose two of said toroidal segments with the number of soft ferrite toroidal segments being in number equal to twice the number of hard ferrite toroidal segments.

4. The dynamoelectric machine of claim 3 wherein said hard ferrite toroidal segments are discrete segments mounted on a disc of magnetizable material.

5. A brushless D.C. dynamoelectric machine, which comprises:
    a disc-like stator element,
    a disc-like rotor element mounted coaxially with and spaced apart from the stator element for rotation about its axis,
    permanent magnet hard ferrite toroid means mounted on said rotor element to provide a plurality of magnetic poles of alternating polarity,
    high permeability soft ferrite toroid means mounted on said stator element, said soft ferrite toroid means being formed as a continuous toroid having a radially-sloping surface defining a narrower thickness at the inner periphery than at the outer periphery, and
    electrical coil windings provided in association with said soft ferrite toroid means by being arranged on the surface of the toroid with the same conductor length subtended at the toroid inner diameter as at the outer diameter.

6. The dynamoelectric machine of claim 5 including cooling means associated therewith to dissipate heat generated by winding losses.

* * * * *